(12) United States Patent
Bachl et al.

(10) Patent No.: US 8,477,864 B2
(45) Date of Patent: Jul. 2, 2013

(54) METHOD OF MULTIPLE-ANTENNA COMMUNICATION HAVING IMPROVED UTILIZATION OF CHANNEL CORRELATIONS

(75) Inventors: Rainer Walter Bachl, Nuremberg (DE); Peter Christian Gunreben, Moehrendorf (DE)

(73) Assignee: Alcatel Lucent, Paris (FR)

( * ) Notice: Subject to any disclaimer, the term of this patent is extended or adjusted under 35 U.S.C. 154(b) by 821 days.

(21) Appl. No.: 12/228,570

(22) Filed: Aug. 14, 2008

(65) Prior Publication Data
US 2010/0040155 A1 Feb. 18, 2010

(51) Int. Cl.
*H04B 7/02* (2006.01)
*H04L 1/02* (2006.01)

(52) U.S. Cl.
USPC .......................... 375/267; 375/295

(58) Field of Classification Search
USPC .......................... 375/260, 267, 295
See application file for complete search history.

(56) References Cited

U.S. PATENT DOCUMENTS

| 2006/0126519 A1* | 6/2006 | Rensburg et al. ............. 370/248 |
| 2006/0285606 A1* | 12/2006 | Khojastepour et al. ....... 375/267 |
| 2007/0041463 A1* | 2/2007 | Wang et al. .................. 375/267 |
| 2007/0223402 A1* | 9/2007 | Waxman ...................... 370/277 |

FOREIGN PATENT DOCUMENTS

EP 1265376 A2 * 12/2002

OTHER PUBLICATIONS

Zhou, S. et al. (Optimal Transmitter Eigen-Beamforming and Space-Time BlockCoding Based on Channel Correlations, IEEE Trans. Inform. Theory, vol. 49, Jul. 2003).*

* cited by examiner

*Primary Examiner* — Sam K Ahn
*Assistant Examiner* — Freshteh N Aghdam
(74) *Attorney, Agent, or Firm* — Wolff & Samson PC

(57) ABSTRACT

A MIMO transmission scheme is provided which provides some advantages of the Alamouti code but which can be adapted so as to provide enhanced performance for a given amount of antenna correlation. A block of complex scalar input symbols is mapped to a block-code matrix which is transmitted as a spacetime signal matrix from an array of two or more antennas. The block-code matrix is assembled by combining input data with specified dispersion matrices. Each of the dispersion matrices is determined, in part, by an adjustable parameter which relates to a degree of beam-forming behavior by the transmission antenna array.

6 Claims, 3 Drawing Sheets

METHOD OF MULTIPLE-ANTENNA COMMUNICATION HAVING IMPROVED UTILIZATION OF CHANNEL CORRELATIONS

FIELD OF THE INVENTION

This invention relates to methods of wireless communication using multiple antennas.

ART BACKGROUND

It has long been known that, at least in theory, the capacity of a wireless communication system can be increased by employing more than one antenna at the transmitter, at the receiver, or at both the antenna and the receiver.

Various multiple-antenna systems have been considered. Among them is a class of systems referred to as "Multiple Input-Multiple Output" (MIMO) systems. In typical MIMO systems, the transmission of a block of message information can be distributed across an array of two or more antennas, and across two or more discrete time intervals, which are sometimes referred to as "transmit symbol intervals" or "channel uses".

The above-described distribution across multiple antennas may be thought of as distributing the transmitted signal across "space," and the distribution over multiple time intervals may be thought of as distributing the transmitted signal across "time." The signal which is to be transmitted is described by a matrix which, accordingly, is referred to as a "spacetime" signal matrix.

In one common form of notation, a typical spacetime signal matrix is T×M, wherein each of the T rows represents a distinct transmit symbol interval and each of the M columns represents a distinct transmit antenna. Within each row, the entry at each of the M column positions is a complex number representing a baseband-level signal value that is to be modulated onto a carrier and transmitted from its respective antenna during the transmit signal interval corresponding to that row.

Each row of the spacetime signal matrix is referred to as a "transmit symbol vector." Each transmit symbol vector may be though of as a row vector containing complex-valued entries. Depending on the specific coding scheme, each of these complex-valued entries may, e.g., be a scalar symbol from a symbol constellation, or a sum of such symbols.

The Alamouti spacetime code is a particular MIMO coding scheme that has received much favorable attention. The Alamouti code works best when the signals from the respective transmit antennas are uncorrelated.

Another way to take advantage of multiple-antenna transmission is by the well-known method of beamforming. Beamforming works best when there is strong correlation among the signals from the respective transmit antennas.

There remain opportunities to improve system performance in the intermediate regime in which there is a moderate amount of correlation among the transmission antennas of a MIMO system.

SUMMARY OF THE INVENTION

We have devised a new method which provides some advantages of the Alamouti code but which can be adapted so as to provide enhanced performance for a given amount of antenna correlation.

In one broad aspect, our method involves mapping a block of complex scalar input symbols to a block-code matrix S. The matrix S is a weighted sum of dispersion matrices, in which the dispersion matrices consist of an A-matrix and a B-matrix for each input symbol, and the weights for each A and B matrix are respectively derived from the real and imaginary parts of the corresponding input symbol. The method further involves transmitting the matrix S as a spacetime signal matrix from an array of two or more antennas during two or more transmit symbol intervals. Each A matrix and each B matrix is determined, in part, by an adjustable parameter which relates to a degree of beam-forming behavior by the transmission antenna array.

In another broad aspect, our method involves decoding a block of complex scalar input symbols from a spacetime signal received on an array of two or more receive antennas from an array of two or more transmit antennas. The method includes obtaining a value $\alpha$ of an adjustable parameter which relates to a degree of beam-forming behavior by the transmission antenna array, and using the value $\alpha$ to recover individual complex scalar symbols that belong to the block.

DETAILED DESCRIPTION

Figure 1:
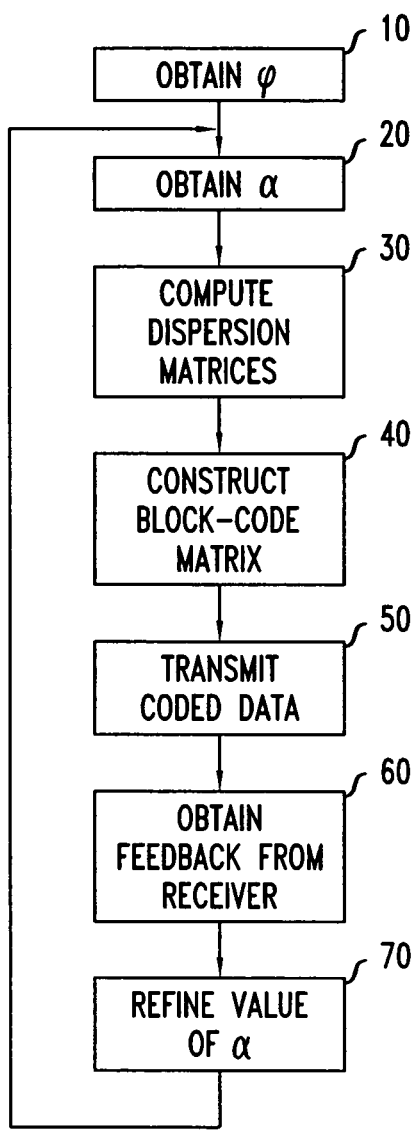
FIG. 1 is a simplified flowchart illustrating the transmission method to be described below, in one embodiment.

Our method involves a type of MIMO coding scheme known as a linear dispersion code. When linear dispersion codes are used, the spacetime signal matrix S is referred to as a "block-code matrix." The block-code matrix S is constructed, for example, from $Q \geq 1$ complex scalar input symbols $s_1, \ldots, s_Q$ as a weighted sum of dispersion matrices $A_q$ and $B_q$, $q=1, \ldots, Q$, according to the formula, $$S = \sum_{q=1}^{Q} (\mathcal{R}\{s_q\}A_q + j\mathcal{I}\{s_q\}B_q).$$

In the above formula, $\mathcal{R}\{x\}$ and $\mathcal{I}\{x\}$ respectively designate the real and imaginary parts of x, and $j^2=-1$. The code is defined by specifying the A and B matrices, i.e., the dispersion matrices $A_q$ and $B_q$.

In an exemplary embodiment of our new method, there are two transmit antennas, Q=2, the dispersion matrices include a variable phase shift $e^{j\phi}$ of the second transmit antenna relative to the first, and the dispersion matrices further include a code adaptation parameter $\alpha$. As will be seen below, the parameter $\alpha$ expresses a measure of how much beamforming behavior will be exhibited by the transmit antenna array.

Our exemplary dispersion matrices are defined by:

$$A_1 = \begin{bmatrix} 1 & e^{j\varphi}\sqrt{\alpha} \\ 0 & e^{j\varphi}\sqrt{1-\alpha} \end{bmatrix}$$

$$A_2 = \begin{bmatrix} \sqrt{\alpha} & e^{j\varphi} \\ -\sqrt{1-\alpha} & 0 \end{bmatrix}$$

-continued $$B_1 = \begin{bmatrix} \sqrt{1-\alpha} & 0 \\ -\sqrt{\alpha} & -e^{j\varphi} \end{bmatrix}$$

$$B_2 = \begin{bmatrix} 0 & e^{j\varphi}\sqrt{1-\alpha} \\ 1 & e^{j\varphi}\sqrt{\alpha} \end{bmatrix}.$$

The range of possible values of $\alpha$ is $0 \leq \alpha \leq 1$. In the extreme cases, the code reduces to the well-known Alamouti code ($\alpha=0$), or to a beamforming scheme ($\alpha=1$).

That is, let x* represent the complex conjugate of x, define $z_1 = \Re\{s_1\} + \Re\{s_2\}$, and define $z_2 = -j\Im\{s_1\} + j\Im\{s_2\}$. Then for the extreme values of $\alpha$, S reduces to the following:

$$S|_{\alpha=0} = \begin{bmatrix} s_1 & s_2 \\ -s_2^* & s_1^* \end{bmatrix}$$

$$S|_{\alpha=1} = \begin{bmatrix} z_1 & e^{j\varphi}z_1 \\ z_2 & e^{j\varphi}z_2 \end{bmatrix}.$$

It is well known from information theory that wireless transmission is limited by a tradeoff between spectrum efficiency and power efficiency. Roughly speaking, the spectrum efficiency is the maximum supportable data rate per available bandwidth and the power efficiency is the energy per bit that needs to be expended in transmission. A transmission scheme can be improved by increasing the data rate at a given power efficiency, by reducing the energy expended in transmission at a given data rate, or by some combination of the two.

Let R represent the code rate of the outer code, and let $E_b/N_0$ represent the energy per bit, per noise-power density. The pair (R, $E_b/N_0$) controls the tradeoff mentioned above. That is, each pair (R, $E_b/N_0$) will result in a certain block error rate in the outer code. By adjusting various parameters of the transmission scheme, it might be possible to maximize R for a given block error rate, or to minimize $E_b/N_0$ for a given value of R, or to achieve some optimal value for the pair.

In the instant case, the parameters that may be adjusted in this manner are $\alpha$ and $e^{j\phi}$.

The phase shift $\phi$ is very important for the beamforming component of our transmission scheme, because it affects the direction and the shape of the beam. In a single-user environment, i.e. without interference, a "good" choice of $\phi$ is that which maximizes the received energy at the receive antennas.

More specifically, the received signal will be a superposition of the two or more transmit signals. In the optimum case for beamforming, absent the imposed phase shift $\phi$, the signals received from the respective transmit antennas will differ at the receive antenna only by a phase shift caused by the difference in propagation delay. The optimum $\phi$ will compensate this phase shift and lead to coherent combining of the two transmit signals at the receive antenna, thereby maximizing the received energy.

The optimal value for $\phi$ will depend on the angular position of the user as viewed from the boresight of the transmit antenna array. For a mobile user, it is desirable to adapt the value of $\phi$ as the angular position of the user changes.

It should be noted in this regard that our transmission scheme is not limited in its applications to the downlink only, but instead can also be applied in the uplink. It should be noted further that the receiver may have a single antenna, or a multiple-antenna array.

When our transmission scheme is applied, e.g., to downlink transmissions, there will be an optimum value of $\alpha$ which depends on the signal to interference and noise ratio (SINR) and on the covariance matrix of the received signals in the uplink. If the antennas that receive on the uplink are identical or equivalent to the antennas that transmit on the downlink, then the correlation between the antenna signals can be measured in the uplink and applied to the transmit scheme in the downlink.

Various methods are available for obtaining a value for $\phi$. For example, any of various well-known tracking algorithms may be used to identify an angular position of the user, or, for the uplink, to identify an angular position of the base station relative to the user.

The code adaptation parameter $\alpha$ may be initially estimated as a value in the range (0,1), for example as 0.5. The initial estimate may be refined using an iterative estimation procedure that may, for example, use feedback information provided by the receiver. The parameter $\alpha$ will typically change relatively slowly, and therefore obtaining a useful estimate will generally be unlikely to involve an excessive amount of network overhead. In general, it will be preferable to obtain at least an initial value of $\phi$ before attempting to optimize $\alpha$.

Thus, with reference to FIG. 1, one useful transmission procedure will include the steps of obtaining values for $\phi$ (block 10) and $\alpha$ (block 20), using those values to compute the dispersion matrices (block 30), using the dispersion matrices and the block of input data to construct the block-code matrix (block 40), and transmitting the block-code matrix (block 50). Optionally, feedback information may be obtained from the receiver (block 60) and used (block 70) to refine the estimate of $\alpha$ prior to a further iteration of the steps illustrated in blocks 30-50.

To receive signals that were transmitted as described above, it is useful to employ minimum mean square estimation (MMSE) in a manner which incorporates knowledge of the channel coefficients for signal propagation between each transmit antenna and each receive antenna. Methods for estimating and communicating the channel coefficients between the respective transmit and receive antennas are well known and need not be described here in detail. An estimate of $e^{j\phi}$ may be made inherently, because this value can be treated as subsumed into the channel coefficients. A explicit value for $\alpha$ is advantageously obtained by the receiver. This may be done, e.g., through explicit signaling from the transmitter, or through a blind iterative estimation procedure.

The type of MMSE known as Widely Linear Minimum Mean Square Estimation (WL-MMSE) is especially useful in this regard. WL-MMSE is designed to improve the estimation of complex signals by using complementary information available when the transmitted signal is not circular, i.e. when the signal is rotationally variant. As will be understood from the above discussion, such complementary information may be available in our transmission scheme, at least for relatively small values of $\alpha$.

The WL-MMSE detector is well known. Very briefly, a scalar random variable y is to be estimated in terms of an observation represented by a random vector x. The estimate of y is designated $\hat{y}$. The WL-MMSE problem is to find the vectors u and v such that the estimate $$\hat{y} = U^H x + V^H x^*$$

gives the least mean-square error. In the above formula, $U^H$ denotes the Hermitian conjugate of U and $V^H$ denotes the Hermitian conjugate of V.

The solution is given by:

$$U = [\Gamma - C\Gamma^{-1} * C^*]^{-1} [P - C\Gamma^{-1} * S^*]$$

$$V = [\Gamma^* - C^*\Gamma^{-1}C]^{-1} [S^* - C^*\Gamma^{-1}P]$$

$$\Gamma = E[xx^H]$$

$$C = E[xx^T]$$

$$P = E[xy^T]$$

$$S = E[xy^T]$$

In the preceding expressions, $E[\bullet]$ denotes expectation value, and $x^T$ is the matrix transpose of x.

In the WL-MMSE receiver as applied to our transmission scheme, the channel coefficients and the parameters $\alpha$ and $\phi$ will be subsumed into the definition of the correlation matrices $\Gamma$, C, P, and S in a manner that will be well understood by those skilled in the art. When received signals are processed in the WL-MMSE receiver, the original block of data is inherently recovered from the block-code matrix via the cross-correlation matrices P and S.

Figure 2:
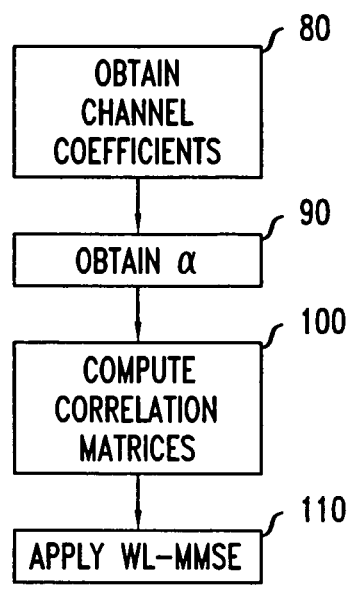
FIG. 2 is a simplified flowchart illustrating the reception method to be described below, in one embodiment.

Thus, with reference to FIG. 2, one useful reception procedure will include the steps of obtaining the channel coefficients (block 80) and $\alpha$ (block 90), computing the correlation matrices $\Gamma$, C, P, and S (block 100), and applying the WL-MMSE receiver process (block 110).

EXAMPLE

Figure 3:
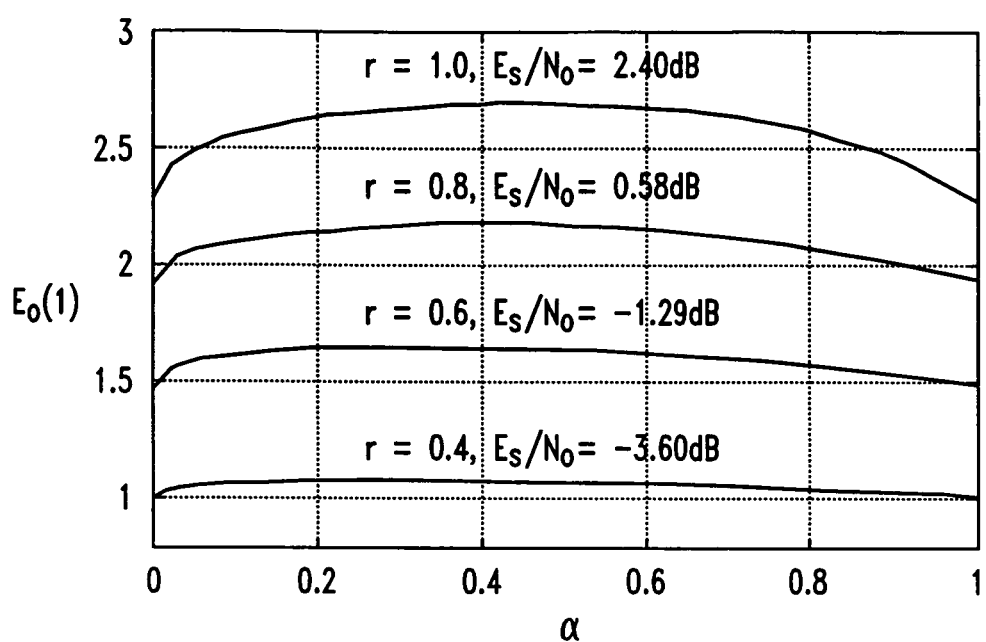
FIG. 3 is a graph showing certain aspects of the performance of our new method according to a numerical simulation.

We conducted numerical simulations to examine the performance of our transmission method. In our model, there were 2 transmit and 2 receive antennas, Q=2, and modulation was QPSK. We made the following assumptions: The wireless channel was non-dispersive, i.e. we assumed a flat fading channel, and the noise component was modeled as additive white Gaussian noise (AWGN). One well-known measure of performance is the Gallager Error-Exponent $E_r(R)$, where R is the code rate and r is the correlation coefficient of the negative exponential correlation model introduced by V. A. Aalo in 1995. This exponent is known to be a measure for the reliability of the transmission without limiting the analysis to a specific forward error correction code. A special case of the Gallager Error-Exponent is the so-called cutoff rate $E_0(1)$. The cutoff rate can be used as a lower bound for the Gallager Error-Exponent in the sense that $E_r(R) \geq E_0(1) - R$. FIG. 3 shows a plot of the cutoff rate versus the code adaptation parameter $\alpha$ for each of four different (R, $E_b/N_0$) pairs, which in order from the uppermost to the lowest plots as seen in the figure are (1.0, 2.40 dB), (0.8, 0.58 dB), (0.6, −1.29 dB), and (0.4, −3.60 dB). It will be seen that in each case, the optimum alpha lies between 0 and 1, thus demonstrating that the new scheme offers gains over both beamforming and the Alamouti code.

What is claimed is:

1. A communication method in which two complex-valued input symbols s1 and s2 having respective real and imaginary parts Re(s1), Im(s1), Re(s2) and Im(s2) are mapped to a block-code matrix S for subsequent transmission, the communication method comprising:
   constructing the block-code matrix S as a weighed sum of dispersion matrices A1, B1, A2, and B2, wherein the weights of A1 and B1 are respectively derived from Re(s1) and Im(s1) and the weights of A2 and B2 are respectively derived from Re(s2) and Im(s2); and
   transmitting the block-code matrix S as a space-time signal matrix from an array of two or more antennas during two transmit symbol intervals;
   wherein the dispersion matrices are defined by $$A_1 = \begin{bmatrix} 1 & e^{j\varphi}\sqrt{\alpha} \\ 0 & e^{j\varphi}\sqrt{1-\alpha} \end{bmatrix}$$

$$A_2 = \begin{bmatrix} \sqrt{\alpha} & e^{j\varphi} \\ -\sqrt{1-\alpha} & 0 \end{bmatrix}$$

$$B_1 = \begin{bmatrix} \sqrt{1-\alpha} & 0 \\ -\sqrt{\alpha} & -e^{j\varphi} \end{bmatrix}$$

$$B_2 = \begin{bmatrix} 0 & e^{j\varphi}\sqrt{1-\alpha} \\ 1 & e^{j\varphi}\sqrt{\alpha} \end{bmatrix};$$

and wherein the constructing of the block-code matrix S comprises selecting a value for $\alpha$ such that $0 < \alpha < 1$ to control a degree of beam-forming behavior by the antenna array, and further comprises selecting a value for $\phi$ based on an angular position of one of a user and a base station relative to the user to control a phase shift between two or more antennas of the array.

2. The method of claim 1, further comprising obtaining values for $\alpha$ and $\phi$ and using the values to construct the dispersion matrices.

3. The method of claim 2, wherein at least one value for $\phi$ is obtained by identifying a relative angular position between the base station and the user.

4. The method of claim 2, wherein the obtaining values for $\alpha$ and $\phi$ comprises:
   obtaining an initial value of $\phi$ and an initial estimate of $\alpha$, and then refining the value of $\alpha$.

5. The method of claim 4, wherein the value of $\alpha$ is refined by an iterative estimation procedure that uses feedback information provided by a receiver.

6. The method of claim 2, further comprising signaling a value for $\alpha$ to a receiver.

* * * * *